May 12, 1942.  E. B. THOMPSON  2,282,621
VEHICLE DUMPING APPARATUS
Original Filed June 15, 1936   3 Sheets-Sheet 1
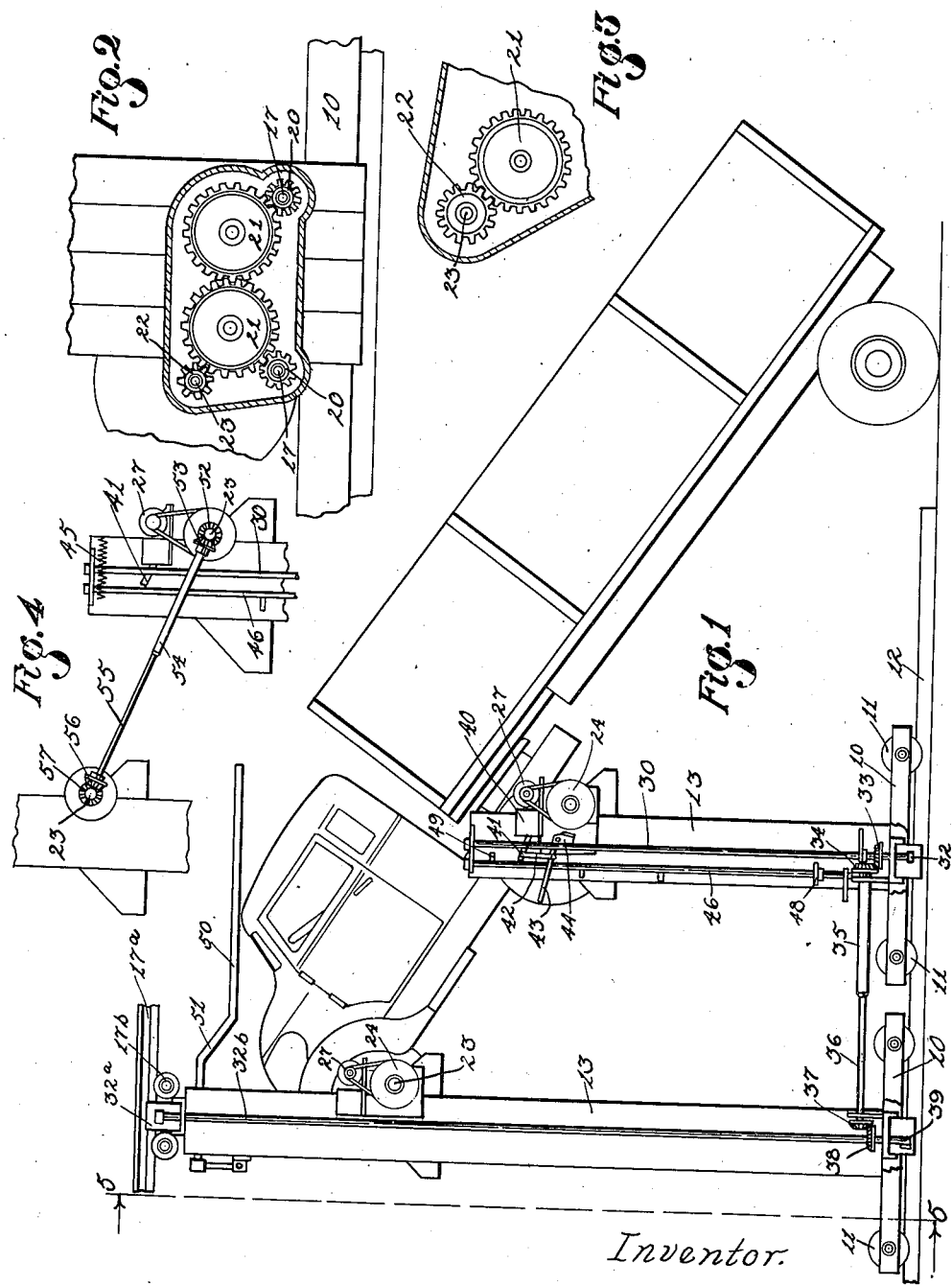
Inventor.
Elmer B. Thompson
by Orwig & Hague Att'ys May 12, 1942. E. B. THOMPSON 2,282,621
VEHICLE DUMPING APPARATUS
Original Filed June 15, 1936 3 Sheets-Sheet 2
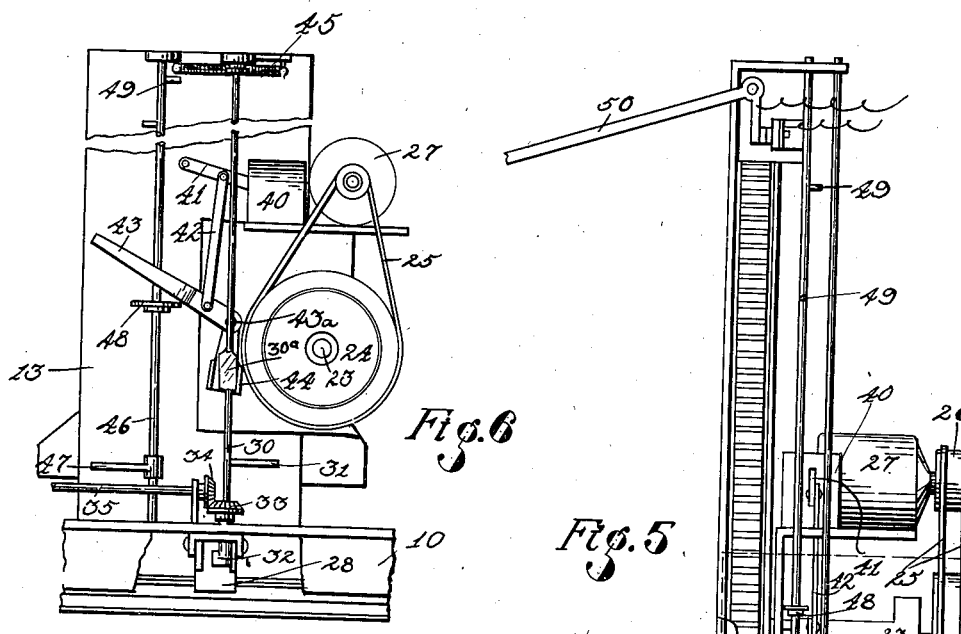
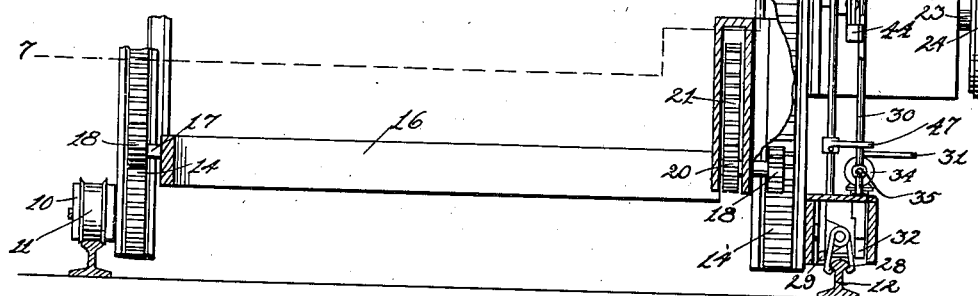
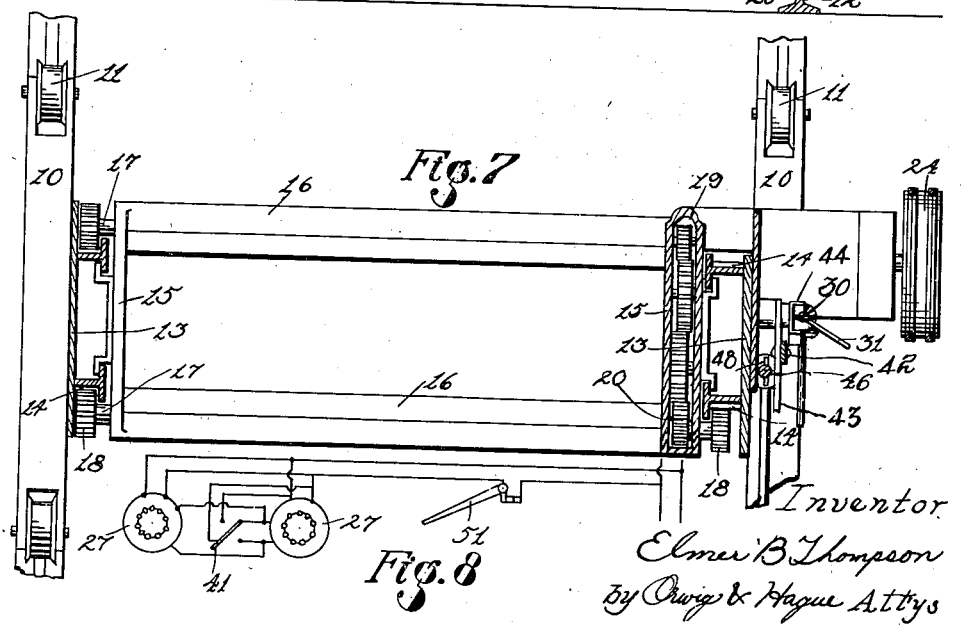
Inventor
Elmer B Thompson
by Orwig & Hague Attys

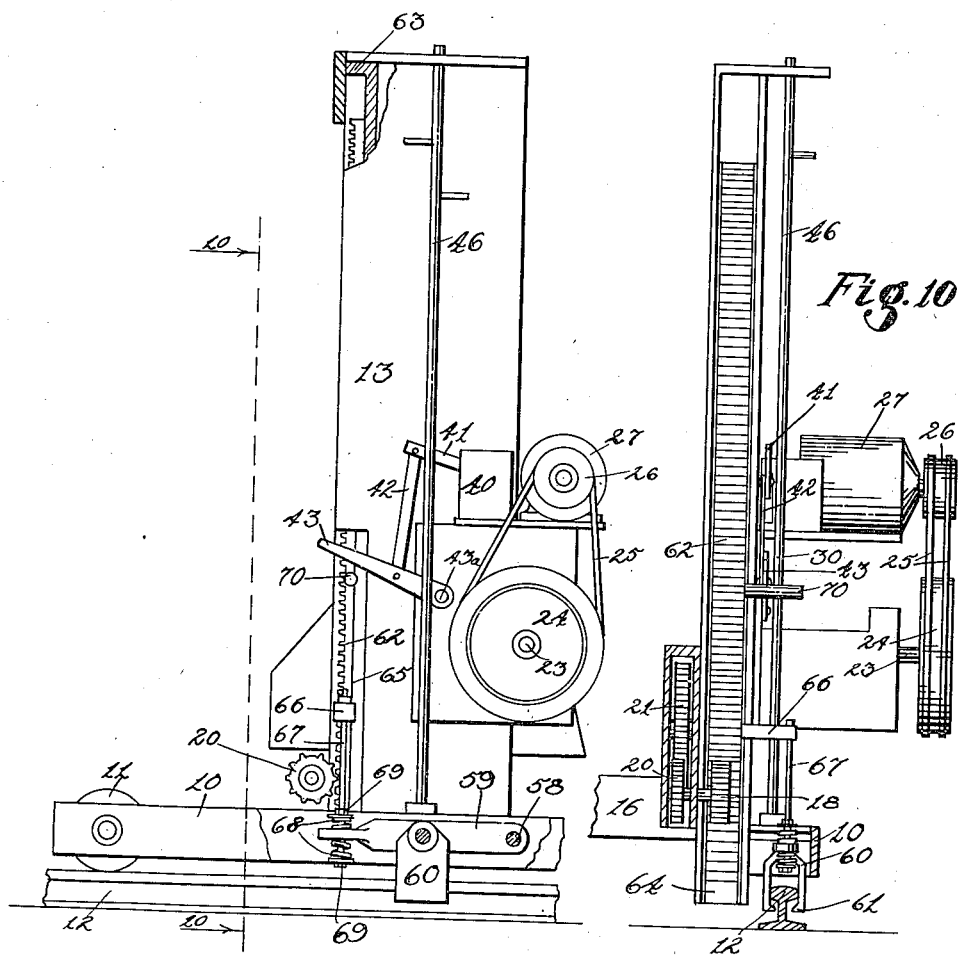

Patented May 12, 1942

2,282,621

UNITED STATES PATENT OFFICE 2,282,621

VEHICLE DUMPING APPARATUS

Elmer B. Thompson, Des Moines, Iowa, assignor to Globe Hoist Company, Des Moines, Iowa, a corporation of Iowa Substituted for abandoned application Serial No. 85,258, June 15, 1936. This application October 2, 1939, Serial No. 297,527

11 Claims. (Cl. 214—16.5)

In the art of vehicle dumping, such, for instance, as dumping grain at grain elevators, it is desirable that the grain be dumped at a predetermined dumping point. In former years substantially all of such grain or the like was delivered to the elevator in wagons of substantially uniform length and having substantially the same distance between the rear axle and the rear of the wagon box, and under such circumstances it was only necessary to provide a single means for engaging and elevating the front wheels. At the present time grain and other products are brought to grain elevators in vehicles of various kinds, including horse-drawn wagons, automobile trucks and trailer trucks, the latter having an axle at the front of the cab, another axle at the rear of the cab, and a third axle at the rear of the trailer body, and there is a limited pivotal connection vertically between the truck and the front of the trailer body. Hence, it would not be practicable to dump the trailer truck by elevating the front wheels only of the truck or the rear wheels only of the truck.

The object of my invention is to provide a lift device of this character of simple, durable and inexpensive construction so constructed and arranged that it may be readily, quickly and easily adapted for use in connection with vehicles of the classes before mentioned, and quickly and easily moved to dumping position to accurately spot the contents of the body at the desired dumping place.

More specifically, it is my object to provide a dumping apparatus of this class which may be readily, quickly and easily adjusted to position for dumping a wagon without unhitching the horses therefrom, or dumping a trailer truck and keeping the three axles of the trailer truck substantially in alinement during the raising and lowering movement, and also for permitting the two independent lift devices to move toward and from each other and toward and from the rear axle of the vehicle during such raising and lowering movement.

More specifically, it is my object to provide two independent lifting devices for the front and rear wheels of a trailer truck vehicle to be moved upwardly and downwardly during a dumping movement, and in which the lift device for the front axle will automatically be moved faster than the lift device for the rear axle thereof, so that the cab will maintain its aligned position relative to the truck body during such movement to and from said dumping position.

More specifically, it is my object to provide a device of this class in which the upward limit of the movement of the wheel-engaging platform may be automatically stopped at several predetermined positions.

A further object is to provide means whereby the lift device may be automatically locked against longitudinal movement during the time that the motor is at rest, and be automatically released for longitudinal movement when the motor is running, and further in this connection provide a gripping device which, when thus released, will prevent tilting movements of the upright supports for the lift in a direction longitudinally of the lift.

A further object is to provide means for automatically stopping the motor during this elevating movement when the vehicle being elevated reaches its upward limit of movement, and further in this connection to provide means for jointly operating the gripping devices of both of the lift devices.

In the accompanying drawings Figure 1 shows a side view of my improved lift with a trailer truck mounted thereon in dumping position;

Figure 2 shows an enlarged detail side view of a part of the lift frame illustrating the gearing mechanism for raising and lowering the wheel-supporting platform, the gear case being shown in section;

Figure 3 shows a similar view of a portion of this gearing mechanism to illustrate the difference in the gear ratio between the two gears of the two lift devices;

Figure 4 shows a detail side elevation of a portion of two adjacent lift devices, and illustrating a modified means for operatively connecting the gearing devices of the two lift devices;

Figure 5 shows a vertical transverse sectional view of my improved lift, partly in section and taken on the line 5—5 of Figure 1;

Figure 6 shows an enlarged detail side elevation illustrating the control lever for the motor and the means for operating the rail-gripping device and also the means for stopping the motor at various points throughout the up and down movement of the lift;

Figure 7 shows a horizontal sectional view taken on the line 7—7 of Figure 5; and Figure 8 illustrates diagrammatically the electric circuit for the two motors;

Figure 9 illustrates my modified form of clamping device;

Figure 10 is a detail sectional view taken on the line 10—10 of Figure 9.

Referring to the accompanying drawings, it will be seen that there are two independent lift devices, each of which comprises a base 10 extended longitudinally of the lift and having grooved supporting wheels 11 at its forward and rear ends. These grooved supporting wheels 11 are mounted upon T rails 12, and projected upwardly from the central portion of the base 10 is a supporting member 13. This supporting member is provided with two upright racks 14, one at the front edge and the other at the rear edge. A similar base and upright device is provided for another rail on the opposite side of the roadway for the vehicles. Slidingly mounted upon these uprights 13 is a vehicle wheel-engaging and supporting platform comprising side members 15 and cross members 16, spaced apart from each other in such position that vehicle wheels may be driven upon this platform and the wheels will be supported against forward or rearward movement relative to the platform by said cross members 16. This sliding platform also holds the upright racks properly spaced apart and prevents them from tilting toward or from each other. In some cases I may add an elevated track rail 17a secured to a suitable support, and grooved wheels 17b on the taller upright rack for preventing tilting movements.

Mounted in the wheel-supporting platform and extended below the cross pieces 16 are two shafts 17, each having a pinion 18 on each end and meshing with their respective racks 14.

For the purpose of driving the shafts 17 to thereby raise and lower the pinions 18 I have provided on the wheel-engaging and supporting platform at one end a gear case 19. Into this gear case the two shafts 17 are extended, and fixed to said shafts within the gear case are two idler gear wheels 20 operatively connected through the idler gear wheels 21, and one of these gear wheels 21 is in mesh with the gear wheel 22 fixed to the shaft 23 which is fixed to a pulley 24 connected by a belt 25 with a pulley 26 on the shaft of the electric motor 27, which motor is also carried by the wheel-supporting and elevating frame.

By means of the construction heretofore described it will be seen that the lift device may be moved toward and from the dumping spot readily and easily upon the wheels 11 on the rails 12, to position for engaging the wheels of a vehicle with the rear of the vehicle at the proper position relative to the dumping spot. Then when the electric motor is turned the gears 18, operating on the racks 14, will raise and lower the wheel-supporting platform.

For the purpose of adapting my vehicle dumping apparatus for use in connection with trailer trucks of the class described, I provide a second lift device in all respects corresponding to that portion of the first lift device previously described, except that the gear wheel 22 is larger than the corresponding gear wheel on the first mentioned lift device, as illustrated in Figure 3, so that when the two electric motors are driven at the same speed, the wheel-engaging and supporting platform of the last mentioned lift will be moved upwardly and downwardly faster than the corresponding part of the first mentioned lift device, and these gears are so proportioned that the lift device for the front wheels of a trailer truck cab will move upwardly and downwardly faster than the lift device for the rear wheels of the trailer truck cab, so that the cab will maintain substantially its normal position relative to a truck body during all positions of its elevating and lowering movement.

For the purpose of at times locking the wheel supports of both lift devices to the rails to prevent longitudinal movement, I have provided the following mechanism: Mounted upon the frame member 10 is a pair of pivoted gripping jaws 28 to pass around the top of the rail 12 and engage the sides of the rail below the top. The outward movement of these gripping jaws is limited by a bolt 29 passed through both jaws, and this outward limit is only sufficient to permit the jaws to slide longitudinally relative to the rail, but not upwardly, so that at all times these gripping jaws prevent tilting movements of the upper ends of the frame members 13 forwardly or rearwardly relative to the lift device. By the use of the term "locking means" as used in the accompanying claims, I mean any device which will hold the frames against longitudinal movement.

For the purpose of applying pressure to the gripping jaws to move them to gripping position, I have provided an upright shaft 30 pivotally supported at its lower end in the frame 10 and having a handle 31 by which it may be manually rotated. At the lower end of this shaft is a cam 32 positioned adjacent one of the gripping jaws and so constructed that when the handle 31 is turned in one direction, the cam will force the adjacent gripping jaw into gripping contact with the rail.

For the purpose of automatically operating the gripping device of the end lift device in unison with that of the intermediate gripping device, I have provided on the shaft 30 a beveled pinion 33 in mesh with a beveled pinion 34, and a square tubular shaft 35 extended forwardly horizontally. A square shaft 36 is telescopically mounted in the square tubular shaft 35. On the other end of the shaft 36 is a beveled pinion 37 in mesh with the beveled pinion 38 on the cam rod 39 of the forward gripping device. By this means the two gripping devices are operated in unison and the lift devices may be moved toward and from each other. I have also provided a locking device to hold the upper end of the taller lift to the elevated rail, for which purpose I provide a gripping device similar to the one I have described for the lower end of the rack and indicated generally by the reference symbol 32a, and connected to said lower locking device by a shaft 32b.

For the purpose of controlling the operation of the two electric motors and for limiting the upward and downward movements of the wheel-supporting platforms, I have provided the following mechanism: Reference numeral 40 indicates generally a switch device for the motor 27, and it is provided with an arm 41. This arm is connected by a link 42 with a manually controlled lever 43, pivoted at 43a, and this lever has fixed to it two downwardly extended walls 44 spaced apart with the rod 30 extended between them. This rod 30 is flat at 30a, as clearly shown in Figure 6, and when in the position shown in Figure 6 the lever 43 may be moved far enough to throw the arm 41 to position for stopping the motor or causing it to rotate in either direction. When, however, the rod 30 is turned to a position at right angles to that shown in Fig. 6, the lever 43 cannot be moved, hence, the motor cannot be operated.

For the purpose of normally holding the flat rod 30 in the position for locking the switch I have provided springs 45 connected to the upper end thereof for yieldingly holding the flat rod 30 in said position. This rail-locking device is normally held in its locking position by the springs 45. When, however, it is desired to release it, then the operator manually moves the lever 31 to releasing position.

It is desirable that the motor cannot be started to move in either direction so long as the gripping device is in locked position, hence, when the gripping device is locked, the flat rod 30 engages both of the walls 44 and prevents movement of the lever 43, hence, before this lever 43 can be moved to start the motor in either direction the operator must manually move the lever 31 from the position shown in Fig. 5, to the position shown in Figure 6, whereupon the lever 43 may be moved to start the motor, and during the movement of the motor in either direction it is necessary that the lift be permitted to move longitudinally upon the track.

For the purpose of automatically stopping the motor when the wheel-engaging and supporting platform has reached any predetermined position of its up and down movement, I have provided the following mechanism: 46 indicates a shaft mounted in the upright frame, as shown in Figure 6, and this shaft is provided with a handle 47 by which it may be rotated. Mounted on the lower portion of this rod is a disc 48, and at the upper portion there are a number of outwardly projecting pins 49 extended at different angles relative to the rod. When the lever 43 is moved downwardly with the wheel-engaging and supporting platform it will strike upon the disc 48, no matter in what position the shaft 46 has been turned, and as the lever 43 moves upwardly with the wheel supporting platform it will strike that particular one of the pins 49 which is projected outwardly into the path of the lever 43, but will not engage the other pins. Hence, by this means the operator may, by placing the handle 47 in various positions, determine the point of elevation at which the lift will automatically stop.

I have also provided a means for automatically stopping the upward movement of both of the lift devices when the vehicle carried thereby reaches its upward limit of movement. I accomplish that by means of a pivoted lever 50 supported above a vehicle on the lift, which lever is connected by a switch lever 51 included in the circuit for the motor, and these parts are so arranged that when the lever 50 is moved upwardly, the circuit is opened.

In Figure 8 I have illustrated diagrammatically a preferred form for the electric circuit. This illustrates the two electric motors of reversible motor type, included in the same circuit in which the switches 51 and 40 are also included.

In the modified form illustrated in Figure 4 I have shown a means for utilizing a single motor on one of the lifts and driving the gear on the other lift from the said motor. This means comprises a beveled pinion 52 connected with the shaft 23 of the gear mechanism for one of the lifts, which beveled pinion is in mesh with the beveled pinion 53 on a hollow squared shaft 54; the squared shaft 55 is telescopically connected with the shaft 54 and has a pinion 56 on its end in mesh with the pinion 57 on the corresponding shaft 23 of the gearing device of the other lift device.

In practical operation, and assuming that the vehicle to be dumped is a horse-drawn wagon, then only the intermediate lift device is used, and the operation is as follows: When the vehicle is to be driven on to the wheel-engaging and supporting platform it is desirable to have the lift device locked to the rails to prevent longitudinal movement thereon, and this is accomplished automatically, as before described. When in this position the electric motor cannot be started because of the flat rod 30 engaging the walls 44 of the switch controlling lever 43, so that before starting the motor, the operator must manually release the gripping device, then the switch controlling lever 43 is moved to position for causing the motor to turn in a direction for raising the lift, and during this raising movement the lift is free to move longitudinally upon the rail. If the operator should neglect to throw the switch 43 when the lift reaches its elevated position, this would be automatically accomplished by having the lever 43 engage one of the pins 49. When the lift is in its elevated position the operator may, if desired, lock the gripping device to the rails, and then before the downward movement can be commenced, the gripping device will again have to be released before the motor can be operated in a direction to lower the lift, and the lowering movement is again automatically stopped by the engagement of the lever 43 with the disc 48, and in the event that the top of the vehicle should approach the danger point when being elevated, and before the upward movement is automatically stopped by the lever 43, then the top of the vehicle will engage the lever 50 and automatically break the circuit and stop the motor. Whether the gripping device is locked to the rail or in its released position, it will at all times serve to prevent the wheel-supporting platform of the lift from tilting forwardly or rearwardly because these gripping jaws engage the under surface of the head of the T rail.

In the event that the vehicle to be elevated is a trailer truck or the like, then the first lift device is moved to position where it will engage the front wheels of the trailer truck and the second lift device moved to position where it will engage the intermediate wheels of the trailer truck, and both of these lift devices may be moved forwardly and rearwardly upon the rails until they are in approximately the right position, then they are locked to the rails by the gripping device and the truck driven on to both of the wheel-receiving and supporting platforms. Then the gripping device must again be released before the motor can be started to elevate. During this elevation these two lift devices will move toward each other and, hence, the wheel-supporting bases must be free for such movement during said elevation, and also, when lowering, the forward one will move away from the intermediate one.

I have found in practice that the two motors connected on the same circuit will rotate at substantially the same speed, and by providing gearing mechanism suitably proportioned I have demonstrated that the forward lift device will have its gearing mechanism operated just enough faster than the gears on the intermediate lift device to hold the cab of the trailer truck in substantially its normal position relative to the truck body, and this relative movement is accomplished automatically without any attention on the part of the operator, and I have found that with this device I can accommodate all of the various sizes and types of vehicles which are in use at the present time for the purposes for which my invention is designed.

I have found that with my improvement considerable expense is avoided in the installation of the apparatus. With my improvement it is only necessary to secure the two rails to the trackway or elevator, as the case may be, whereas, with devices of this character previously used it was necessary to install part, or most, of the apparatus under the roadway or elevator.

In modern elevators it is customary to have numerous dumping receptacles for different kinds of grain or products. With my improved apparatus the entire lift device may be readily and easily moved along the rails to bring the rear of the vehicle to any selected one of a series of dumping spots.

In Figures 9 and 10 I have illustrated a modified form of rail gripper and means for automatically operating the same. In the employment of this modified form I eliminate the shafts 30, 32b, the shafts 35 and 36, together with the associated bevel gears and the gripper members 32. Instead of the grippers 32 I have provided in the members 10 a shaft 58 having mounted thereto one end of a lever 59. Pivotally connected to the central portion of the lever 59 is a yoke or gripping device 60 having at its lower ends inwardly turned portions 61 designed to engage the under surface of the ball of the rail 12 when the yoke is at an elevated position of movement, and to free said rail when in a lowered position of movement, to thereby provide means whereby the rail will be gripped and the frame 10 held against longitudinal movement when the free end of the lever 59 is elevated.

For elevating and lowering the lever 59 I have provided in each of the T bars supporting the racks 14, in place of said racks, a slidably mounted rack bar 62, limited against upward movement by means of an outwardly extending lug 63 and against downward movement by means of a lug 64, the rack 62 being shorter than the distance between the lugs 63 and 64, so that said rack bars are permitted to move vertically relative to the frame members 13, the said rack bars being in mesh with the pinions 18. The lower end of one of the frame members 13 is provided with a notch 65 for receiving the bracket 66, one end of which is fixed to the rack 62 and the other end projecting laterally to a position over the free end of the lever 59. Supported in the bracket 66 is a rod 67 having its lower end threaded and passing through said lever 59 and adapted to support springs 68 above and below said lever, said springs being secured in position by nuts 69. The rack bar 62 is also provided with a laterally extending pin 70 designed to engage the lower edge of the lever 43 when the lift is at or near its lower position of movement.

From the above construction it will be seen that if the pinions 18 are rotated in one direction, then the lift will be elevated in the manner before described. In like manner, if the pinions 18 are rotated in the opposite direction, then the lift will be lowered until the members 16 engage the floor on which the lift is mounted. Further rotation of the said pinions 18 will then cause the rack 62 to be elevated, and with it the pin 70, which will at that time engage the under surface of the lever 43, causing said lever to be elevated and the motor 27 to become inoperative. In this connection it should be borne in mind that the discs 48 may be eliminated and the pin 70 used to perform the same function. This upward movement of the racks 62 will cause the lever 59 to also be elevated and the gripper set to lock the trucks against longitudinal movement.

In the gripping arrangement before described the grippers were set and released by a hand-actuated lever, and it was necessary to provide means for properly connecting the grippers of both of the trucks, while in the modified form each of the trucks is provided with an independent and automatically-operated gripping mechanism, so arranged that at all times when the lifts are down the grippers are set.

This application is a substitute for applicant's former application filed June 15, 1936, Serial No. 85,258, for a Vehicle dumping apparatus, which became forfeited by non-payment of the final government fee.

I claim as my invention:

1. In a device of the class described, the combination of a lift frame, grooved supporting wheels, one extended rearwardly and one forwardly from the frame, a T rail fixed in position and having said grooved wheels mounted thereon, a pair of gripping jaws carried by the frame and positioned one on each side of the rail, means for limiting the outward movement of the jaws relative to the rail so that at all times the jaws will extend under the head of the rail and limit the upward movement of the jaws relative to the rail, a manually operable cam carried by the frame for moving one of the jaws to gripping position on the rail, an electric motor driven mechanism carried by the frame for raising and lowering a vehicle, a manually operable switch device for the motor, said switch device having two spaced apart walls carried thereby, a flat rod connected to said cam and extended between said spaced apart walls on said switch device, said parts being so arranged and proportioned that when the flat rod is in position parallel with the sides of said flat rod the said switch device may be moved, and when said flat rod is at right angles to said walls, the switch device will be held in its inoperative position.

2. In a device of the class described, the combination of a lift frame, grooved supporting wheels, one extended rearwardly and one forwardly from the frame, a T rail fixed in position and having said grooved wheels mounted thereon, a pair of gripping jaws carried by the frame and positioned one on each side of the rail, means for limiting the outward movement of the jaws relative to the rail so that at all times the jaws will extend under the head of the rail and limit the upward movement of the jaws relative to the rail, a manually operable cam carried by the frame for moving one of the jaws to gripping position on the rail, an electric motor driven mechanism carried by the frame for raising and lowering a vehicle, a manually operable switch device for the motor, said switch device having two spaced apart walls carried thereby, a flat rod connected to said cam and extended between said spaced apart walls on said switch device, said parts being so arranged and proportioned that when the flat rod is in position parallel with the sides of said flat rod the said switch device may be moved, and when said flat rod is at right angles to said walls, the switch device will be held in its inoperative position, and spring actuated means for normally holding said cam in its withdrawn position.

3. In a device of the class described, the combination of a lift frame, a vehicle supporting frame vertically slidable upon the lift frame, an electric motor carried by the vehicle supporting frame, a switch device for the electric motor including a projecting arm by which the switch may be operated, an upright rod rotatably supported upon the lift frame, a handle on the rod for turning it to different positions of its rotary movement, a series of stops fixed to the rod at different elevations and projected outwardly therefrom at different angles, and so arranged relative to the said arm that any selected one of said stops may be placed in the path of the arm and when engaged by the arm will move the switch to position for stopping the motor, and a disc-shaped stop device at the lower end of the rod to be engaged by the said arm when at its lower limit of movement and when the rod is in any of its adjusted positions, to thereby move said arm to position for stopping the motor.

4. A vehicle dumping apparatus, comprising a lift device for engaging and elevating the front portion of a vehicle, a second lift device for engaging and elevating the same vehicle at a point between the ends of the vehicle, means for raising and lowering the front lift at one rate of speed and the other lift at a less rate of speed and whereby the vehicle engaging portions of both lifts will hold the front portions of the vehicle substantially in line with the rear portion of the vehicle when in any position of its movements to and from said dumping position, means for movably supporting each of said lifts for permitting them to move horizontally toward and from each other and toward and from the dumping point for the vehicle during a vehicle dumping movement, a locking device for each of said devices to prevent said horizontal movement, means for jointly operating said locking devices, a manually operable lever for controlling the means for raising and lowering the lift devices, spring actuated means for normally holding said locking devices in position for preventing movement of said lever, and manually operable means for moving said locking devices to position for permitting movement of said lever.

5. The combination of a vehicle lift frame, means for movably supporting it, a rail extended longitudinally relative to the path of movement of the lift, an automatic gripping device carried by the lift frame for gripping the rail, means carried by the lift frame for raising and lowering the lift, a manually operable element carried by the lift frame for controlling the means for raising and lowering the lift, said element when in one position causing the raising and lowering mechanism to operate, and when in another position causing the raising and lowering mechanism to be inoperative, manually operable means for releasing said gripping device, and a locking device for holding said element in an inoperative position, said locking device and said gripping device being operatively connected so that when the gripping device is in gripping position the said element is held in inoperative position.

6. The combination of a vehicle lift frame, means for movably supporting it, a rail extended longitudinally relative to the path of movement of the lift frame, a gripping device carried by the lift frame for gripping the rail, means carried by the lift frame for raising and lowering the lift, a manually operable element carried by the lift frame for controlling the means for raising and lowering the lift, said element when in one position causing the raising and lowering mechanism to operate, and when in another position causing the raising and lowering mechanism to be inoperative, a locking device for holding said element in its inoperative position, and means operatively connected with said gripping device and with said locking device for holding jointly the gripping device and the locking device in an inoperative position, or jointly holding both in released position.

7. The combination of a vehicle lift frame, means for movably supporting it, a rail extended longitudinally relative to the path of movement of the lift frame, a gripping device carried by the lift frame for gripping the rail, means carried by the lift frame for raising and lowering the lift, a manually operable element carried by the lift frame for controlling the means for raising and lowering the lift, said element when in one position causing the raising and lowering mechanism to operate, and when in another position causing the raising and lowering mechanism to be inoperative, a locking device for holding said element in its inoperative position, means operatively connected with said gripping device and with said locking device for holding jointly the gripping device and the locking device in an inoperative position, or jointly holding both in released position, a second similar lift frame equipped with a similar rail gripping device, and an extensible power transmitting connection between said gripping devices whereby the said second gripping device is operated in unison with the first when said lift frames are in any position of their movement relative to each other.

8. In a device of the class described, the combination of a vehicle lift frame, a lift carried by the frame, two supporting wheels for the frame spaced apart one in advance of the other, a rail upon which said wheels are mounted, an antitilting device carried by the frame between said wheels to cooperate with the rail to prevent upward movement of the frame relative to the rail, a rail gripping member carried by the frame, and means for automatically actuating it to release the rail when the lift is being raised or lowered and to automatically grip the rail when the lift is stationary.

9. In a device of the class described, the combination of a vehicle lift frame, a lift carried by the frame, two supporting wheels for the frame spaced apart, one in advance of the other, a rail upon which said wheels are mounted, an antitilting device carried by the frame between said wheels to cooperate with the rail to prevent upward movement of the frame relative to the rail, including a rail-gripping member carried by the frame, and means actuated upon by elevating and lowering the lift for clamping or releasing the gripping means automatically to and from the rail when the lift is near its lower position of movement.

10. An apparatus for dumping vehicles of the class having a truck and a trailer, comprising a platform to receive and support truck wheels, a second platform to receive and support the front wheels of a trailer, means for jointly elevating and lowering said platforms to and from dumping position of the trailer, said means including mechanism for moving the truck platform faster than the trailer platform to maintain the truck and trailer in substantially longitudinal alignment during a dumping movement, means for supporting said platform for free longitudinal movement for permitting both platforms to move in arcs centered at the axis of the rear wheels of a trailer being dumped, and means actuated by the final lowering movement and the initial elevating movement of said lifts for locking and unlocking said lift-supporting means against longitudinal movement automatically when the lifts are at their lowered positions.

11. An apparatus for dumping vehicles of the class having a truck and a trailer, comprising a platform to receive and support truck wheels, a second platform to receive and support the front wheels of a trailer, a prime mover operatively connected therein for jointly elevating and lowering said platforms to and from dumping position of the trailer, said means including mechanism for moving the truck platform faster than the trailer platform to maintain the truck and trailer in substantially longitudinal alignment during a dumping movement, means for supporting said platform for free longitudinal movement for permitting both platforms to move in arcs centered at the axis of the rear wheels of a trailer being dumped, means actuated by the final lowering movement and the initial elevating movement of said lifts for locking and unlocking said lift-supporting means against longitudinal movement automatically when the lifts are at their lowered position, and means actuated by said lowering movement for automatically causing said prime mover to become inoperative.

ELMER B. THOMPSON.